US010045305B2

(12) United States Patent
Jaulin

(10) Patent No.: US 10,045,305 B2
(45) Date of Patent: Aug. 7, 2018

(54) RADIO-COMMUNICATION SYSTEM, COMPRISING MEANS FOR ASSOCIATING A RADIO-COMMUNICATION TERMINAL WITH A RADIO-COMMUNICATION STATION, RADIO-COMMUNICATION STATION AND TERMINAL OF SUCH OF A SYSTEM AND ASSOCIATION METHOD

(71) Applicant: SAGEMCOM BROADBAND SAS, Rueil Malmaison (FR)

(72) Inventor: Jean-Philippe Jaulin, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 147 days.

(21) Appl. No.: 15/104,764

(22) PCT Filed: Dec. 15, 2014

(86) PCT No.: PCT/EP2014/077698
§ 371 (c)(1),
(2) Date: Jun. 15, 2016

(87) PCT Pub. No.: WO2015/091327
PCT Pub. Date: Jun. 25, 2015

(65) Prior Publication Data
US 2016/0316437 A1 Oct. 27, 2016

(30) Foreign Application Priority Data
Dec. 16, 2013 (FR) ...................................... 13 62692

(51) Int. Cl.
*H04W 52/16* (2009.01)
*H04W 48/08* (2009.01)
(Continued)

(52) U.S. Cl.
CPC ............. *H04W 52/16* (2013.01); *H04L 43/16* (2013.01); *H04W 48/08* (2013.01); *H04W 48/20* (2013.01);
(Continued)

(58) Field of Classification Search
CPC ... H04W 48/08; H04W 48/20; H04W 52/146; H04W 52/16; H04W 52/325; H04W 52/50; H04L 43/16
See application file for complete search history.

(56) References Cited

U.S. PATENT DOCUMENTS

2009/0093232 A1 4/2009 Gupta et al.
2010/0016022 A1 1/2010 Liu et al.
(Continued)

FOREIGN PATENT DOCUMENTS

WO WO 2009/064932 5/2009

OTHER PUBLICATIONS

International Search Report and Written Opinion of the ISA for PCT/EP2014/077698, dated Jan. 26, 2015, 15 pages.
(Continued)

*Primary Examiner* — Paul H Masur
(74) *Attorney, Agent, or Firm* — Nixon & Vanderhye, PC

(57) ABSTRACT

A radio-communication system comprising at least one radio-communication station and at least one radio-communication terminal, each radio-communication station having apparatus for sending beacon signals, some of the beacon signals sent carrying association information indicating the availability or not of the radio-communication station for executing an association operation, the radio-communication terminal having apparatus for, on reception of a beacon signal carrying association information showing the availability of the radio-communication station that sent the (Continued)

Figure 1:
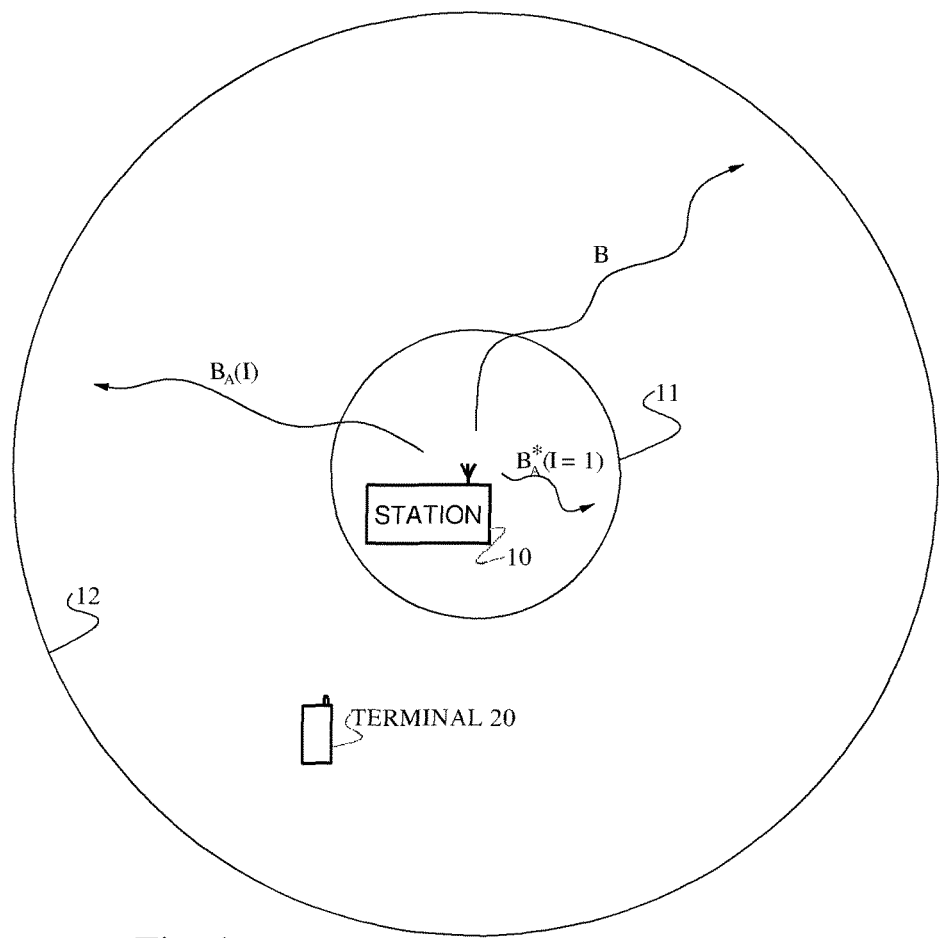

beacon signal, initiating the execution of the association operation with respect to the radio-communication station.

14 Claims, 4 Drawing Sheets

(51) Int. Cl.

| | |
|---|---|
| *H04W 48/20* | (2009.01) |
| *H04W 52/32* | (2009.01) |
| *H04W 52/50* | (2009.01) |
| *H04L 12/26* | (2006.01) |
| *H04W 84/12* | (2009.01) |
| *H04W 52/14* | (2009.01) |
| *H04W 88/02* | (2009.01) |
| *H04W 88/08* | (2009.01) |

(52) U.S. Cl.
CPC ......... *H04W 52/325* (2013.01); *H04W 52/50* (2013.01); *H04W 52/146* (2013.01); *H04W 84/12* (2013.01); *H04W 88/02* (2013.01); *H04W 88/08* (2013.01)

(56) References Cited

U.S. PATENT DOCUMENTS

| | | |
|---|---|---|
| 2010/0048212 A1 | 2/2010 | Yavuz et al. |
| 2013/0279381 A1* | 10/2013 | Sampath ............... H04W 48/08 370/311 |
| 2014/0071850 A1* | 3/2014 | Abraham ............ H04W 76/021 370/254 |
| 2014/0071883 A1* | 3/2014 | Abraham ................ H04B 7/14 370/315 |
| 2014/0075189 A1* | 3/2014 | Abraham ............. H04W 76/04 713/168 |
| 2014/0204826 A1* | 7/2014 | Cherian ................ H04W 48/14 370/312 |
| 2016/0157158 A1* | 6/2016 | Jeong .................... H04W 48/20 370/315 |
| 2016/0174270 A1* | 6/2016 | Jeong .................... H04W 48/08 370/315 |

OTHER PUBLICATIONS

"Digital Enhanced Cordless Telecommunications (DECT); Common Interface (CI); Part 5: Network (NWK) layer; ETSI EN 300 175-5", IEEE, vol. DECT, No. V2.1.8, Mar. 1, 2008, 248 pages.

"Digital Enhanced Cordless Telecommunications (DECT); Common Interface (CI); Part 3: Medium Access Control (MAC) layer; Final draft ETSI EN 300 175-3", IEEE, vol. DECT, No. V2.0.1, Mar. 1, 2007, 252 pages.

* cited by examiner

RADIO-COMMUNICATION SYSTEM, COMPRISING MEANS FOR ASSOCIATING A RADIO-COMMUNICATION TERMINAL WITH A RADIO-COMMUNICATION STATION, RADIO-COMMUNICATION STATION AND TERMINAL OF SUCH OF A SYSTEM AND ASSOCIATION METHOD

This application is the U.S. national phase of International Application No. PCT/EP2014/077698 filed 15 Dec. 2014, which designated the U.S. and claims priority to FR 13/62692 filed 16 Dec. 2013, the entire contents of each of which are hereby incorporated by reference.

The present invention relates to an association method for associating a radio-communication terminal with a radio-communication station of a radio-communication system, as well as a radio-communication system comprising at least one radio-communication station and at least one radio-communication terminal for implementing said method. The present invention also relates to a radio-communication station and a radio-communication terminal respectively provided for implementing said association method.

Establishing communication between a radio-communication station, such as a base station of a radio-communication system (DECT, Bluetooth, ZigBee, Wi-Fi or the like) and a radio-communication terminal, for example mobile, of said radio-communication system, requires the prior execution of an operation of association between them, an operation performed once and for all. This association operation comprises among other things the exchange of messages containing information, such as security keys and identifiers, and the registration of this information and the like in the radio-communication station and in the terminal. These identifiers and security keys are necessary for the establishment of each of the radio communications.

To initiate the execution of this association operation, the association methods according to the prior art generally require active intervention by the user on the radio-communication terminal and, often also, on the radio-communication station.

To illustrate this point, this association operation is described below in the case where the radio-communication system in question is the DECT (Digital Enhanced Cordless Telecommunication) system that is described in the standards ETSI EN 300 175 Parts 1 to 8 and ETSI EN 300 444.

In this DECT system, a base station comprises means for sending beacon signals that are used for transmitting system information and synchronising radio-communication terminals that were previously associated. These beacon signals are carried by a system information channel Q of the BMC (Broadcast Message Control) service. Some of these beacon signals carry association information that indicates the availability or not of the base station for executing an association operation. These beacon signals in this case carry a so-called Q3 message (a QH message the header H of which is equal to 3 for messages concerning capabilities of the fixed part, in this case the base station (see ETSI EN 300 175-3, in particular sections 5.2.2, 5.3.4.1 and 7.2.3.4)). Regarding the association information, it is carried by bit a$44$ (see appendix F.1 of ETSI EN 300 175-5 relating to the higher-layer capabilities)) which, positioned at 0, indicates that the base station is not available for an association operation (in particular, the base station does not accept an association request coming from a radio-communication terminal), whereas positioned at 1 on the contrary indicates that the base station is available for the association operation (the base station accepts any request emanating from a terminal).

An association method is described in appendix A of ETSI EN 300 444. It then comprises the following steps:

A first step in which the user, by an intentional action on the base station (for example pressing on a key or selecting a menu), makes it possible to position the base station, for a predetermined period, in a mode where it is available for executing said association operation. At this moment, the beacon signals (for example carrying Q3 messages) are sent with the association information indicating that the base station is available for an association operation (bit a$44$=1).

In a second step, the user, also by means of an intentional action (for example activation of a particular menu) now on the radio-communication terminal that he wishes to associate with the base station, positions said radio-communication terminal in an association-attempt mode. As from this moment, this terminal seeks a beacon signal, the association information of which indicates the availability of the base station (beacon signal Q3 with bit a$44$ positioned at 1). To do this, it analyses each of the channels sent by the base station, and then, after detection of a transmission on a channel, each of the time slots containing a radio packet containing said beacon signal.

In a third step, the mobile terminal, once a beacon signal has been received with association information indicating the availability of the base station (message Q3 with bit a$44$ at 1), initiates the execution of the association operation.

To do this, it sends to the base station an association request (ACCESS-RIGHT-REQUEST). On reception of this association request, the base station sends to the mobile terminal a key-allocation request (KEY-ALLOCATION). The processing of the latter request essentially comprises the generation of security keys on either side, verification of the matching of these keys, and the exchange of particular messages. Once this request has been processed successfully, the base station stores in memory the identifier of the mobile terminal and the security key generated. Finally, it transmits a message to the mobile terminal in order to accept the finalisation of the association (ACCESS-RIGHT-ACCEPT). On reception of this last message, the mobile terminal stores in memory the identifier of the base station and the security key generated at the previous step.

Finally, the base station now, in the beacon signals carrying the association information that it sends, positions the association bit a$44$ at 0 (the association information now indicates that the base station is not available for executing an association operation).

As can be noted, this association operation is triggered by one or more actions of the user on at least one of the two devices. It requires the use of menus and submenus, sometimes making it not very intuitive, so that it may prove to be complex for an unskilled user. This operation may also be designed to be complex for a user not familiar with technology.

The messages sent by the operations described above being transmitted by means of the radio link, the power of which may be several tens of milliwatts, these operations can be performed while the base station and the mobile terminal are distant by several tens to a few hundreds of meters. A base station available for an association operation (association bit a$44$=1) may thus receive an association request from another distant mobile terminal. Likewise, a mobile terminal seeking a base station with which to associate may therefore detect potentially distant base stations, and may also transmit long-distance messages.

To guarantee a minimum level of security, the ETSI standardisation EN 300 444 imposed a certain number of rules for preventing accidental and undesired associations, in particular:

- an action by the user is essential on the base station to activate it in an operating mode wherein it is available for an association operation and wherein it can receive association requests from a terminal,
- the duration of this activation is temporary and limited to a few tens of seconds,
- as soon as an association operation has been performed, the base station goes back into a mode where it is unavailable for an association operation and where it is not allowed to respond to the reception of a request from a terminal (bit a44=0),
- the base station is allowed to accept only the association requests coming from mobile terminals using an agreed personal identification code PIN.

These rules do not lead to simplification of the association operations.

There also exist association methods by simply bringing together the devices to be associated. This is for example the case with devices using so-called "NFC (Near Field Communication) Easy Connect" technology, which allows the association of two items of equipment using an NFC connection for exchanging the connection information used for establishing the main communication by the Bluetooth network. This method, which is very simple, nevertheless requires the use of dedicated components for implementing the NFC connection.

The aim of the invention is to propose an association method that considerably simplifies this procedure, in particular by eliminating the manipulations to be made by the user on the base station and on the mobile terminal.

To do this, the radio-communication station comprises sending means for sending beacon signals that serve for the transmission of information and for the synchronisation of the radio-communication terminals that were previously associated. Some of these beacon signals carry association information that indicates the availability or not of the base station for executing an association operation.

As for the radio-communication terminal, it comprises means for, when a beacon signal is received comprising association information showing the availability of a radio-communication station sending said beacon signal, initiating the execution of said association operation with said radio-communication station.

According to the present invention, the sending means of said radio-communication station are configured to send at least some of said beacon signals carrying association information at reduced power compared with the transmit power of the other beacon signals. In addition, the association information of said bacon signals sent at reduced power by a radio-communication station is such that said association information continuously indicates that said radio-communication station is available for performing an association operation.

According to another advantageous feature of the present invention, a radio-communication terminal comprises means for initiating the execution of said association operation with a radio-communication station on reception firstly of a beacon signal sent at reduced power that comprises association information indicating the availability of said radio-communication station and secondly of a beacon signal, sent at non-reduced power by the same radio-communication station, which comprises association information indicating non-availability of said radio-communication station.

According to another advantageous feature of the present invention, a radio-communication terminal comprises means for distinguishing, on the basis of the receive power, the beacon signals send at reduced power and the beacon signals sent at non-reduced power and for initiating the execution of the association operations by selecting if necessary the particular radio-communication station that sent the beacon signals at reduced power.

According to another advantageous feature of the present invention, a radio-communication terminal comprises means for comparing the receive power level of a beacon signal carrying association information indicating that said radio-communication station is available for performing an association operation with a threshold value and initiating the execution of said association operation with said radio-communication station only if said receive power level is lower than said threshold value.

According to another advantageous feature of the present invention, each radio-communication station and/or radio-communication terminal is provided with means so that the message exchanges during association operations are carried out at reduced power.

According to another advantageous feature of the present invention, each radio-communication station is provided with means for displaying a code and means for checking that a code transmitted by a radio-communication terminal when the association operation is executed is identical to the displayed code.

The present invention can apply to a radio-communication system as just described but which in addition is of the type where the communications between a radio-communication station and a radio-communication terminal take place by transmission of frames.

In this case, according to a first embodiment, a radio-communication station is configured to send at reduced power a beacon signal carrying association information indicating the availability of said radio-communication station in the same frame as another beacon signal sent at non-reduced power, carrying association information indicating the non-availability of said radio-communication station.

According to another embodiment, a radio-communication station is configured to cyclically send a series of beacon signals carrying association information indicating the availability or not of said radio-communication station, at least one beacon signal in said series being a beacon signal, sent at reduced power, carrying association information indicating the availability of said radio-communication station.

According to another advantageous feature of the present invention, a radio-communication station is configured to deactivate the sending at reduced power of the beacon signals carrying association information continuously indicating that it is available for performing an association operation.

According to another advantageous feature of the present invention, a radio-communication terminal is, before association, in an association-seeking mode in which it continuously seeks beacon signals, in which the association information indicates the availability of a radio-communication station, said beacon signals being sent at reduced power, The present invention also relates to a radio-communication station and a radio-communication terminal that each have the features mentioned above.

The present invention also relates to a method for associating a radio-communication terminal with a radio-communication station in a radio-communication system as just described.

The present invention also relates to a program recorded on a medium and intended to be loaded into a programmable device of a radio-communication station as just described, said program comprising instructions or code parts for enabling the means of said radio-communication station to be implemented when said program is executed by said programmable device.

Likewise, the present invention also relates to a program recorded on a medium and intended to be loaded into a programmable device of a radio-communication terminal as just described, said program comprising instructions or code parts for enabling the means of said radio-communication terminal to be implemented when said program is executed by said programmable device.

Figure 2A:
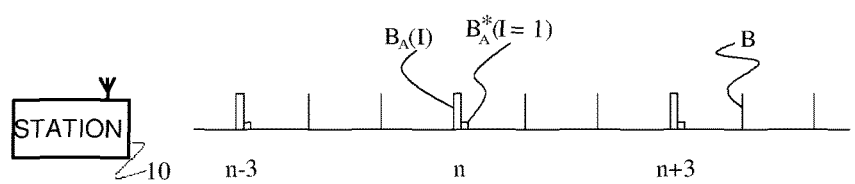
Figure 2B:
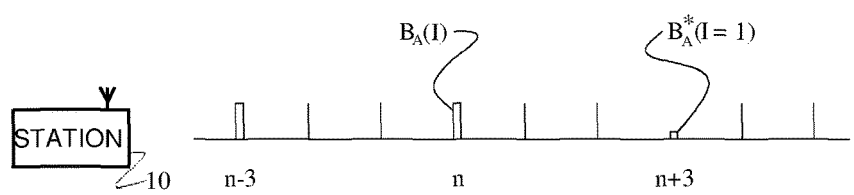
Figure 3:
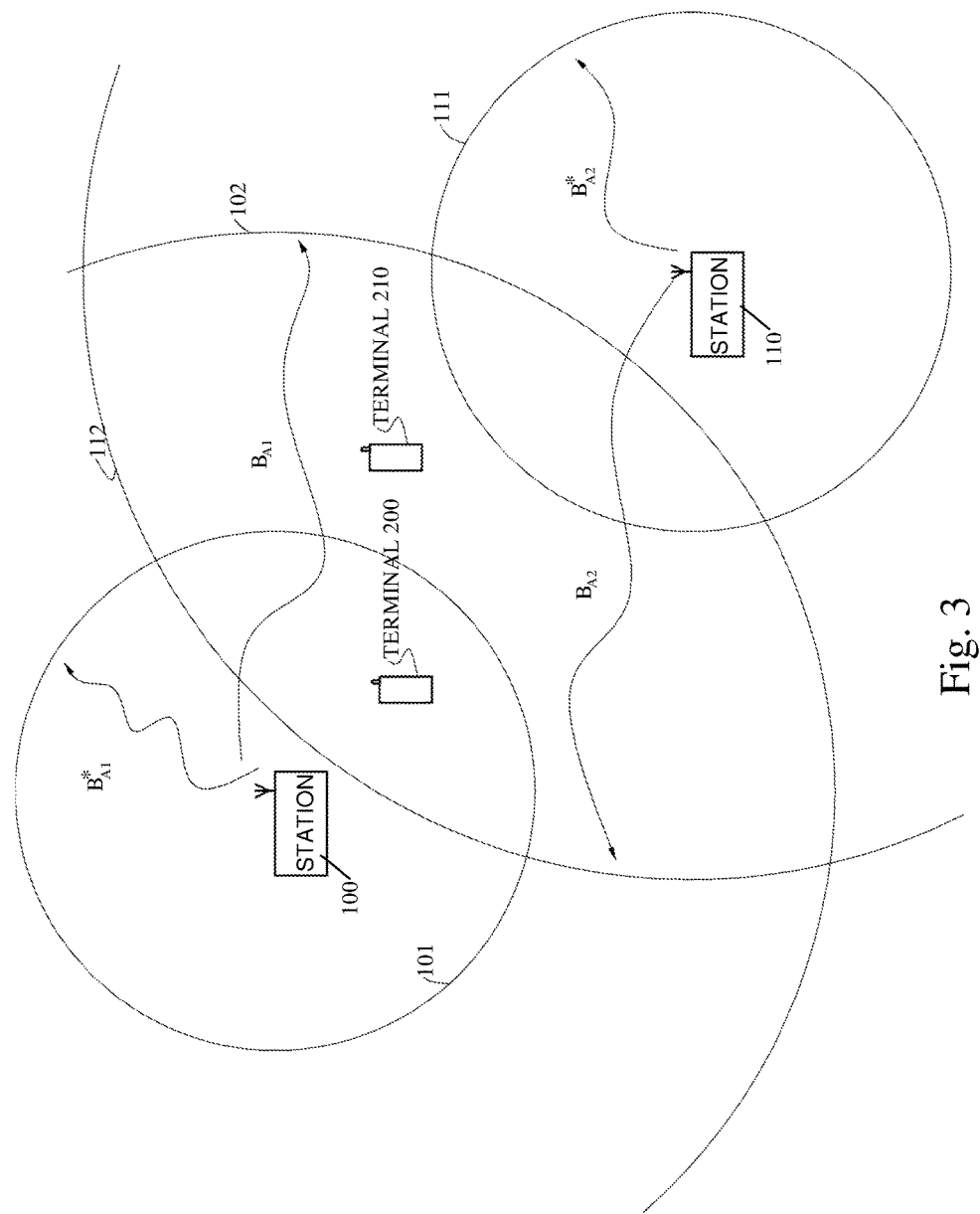
Figure 4:
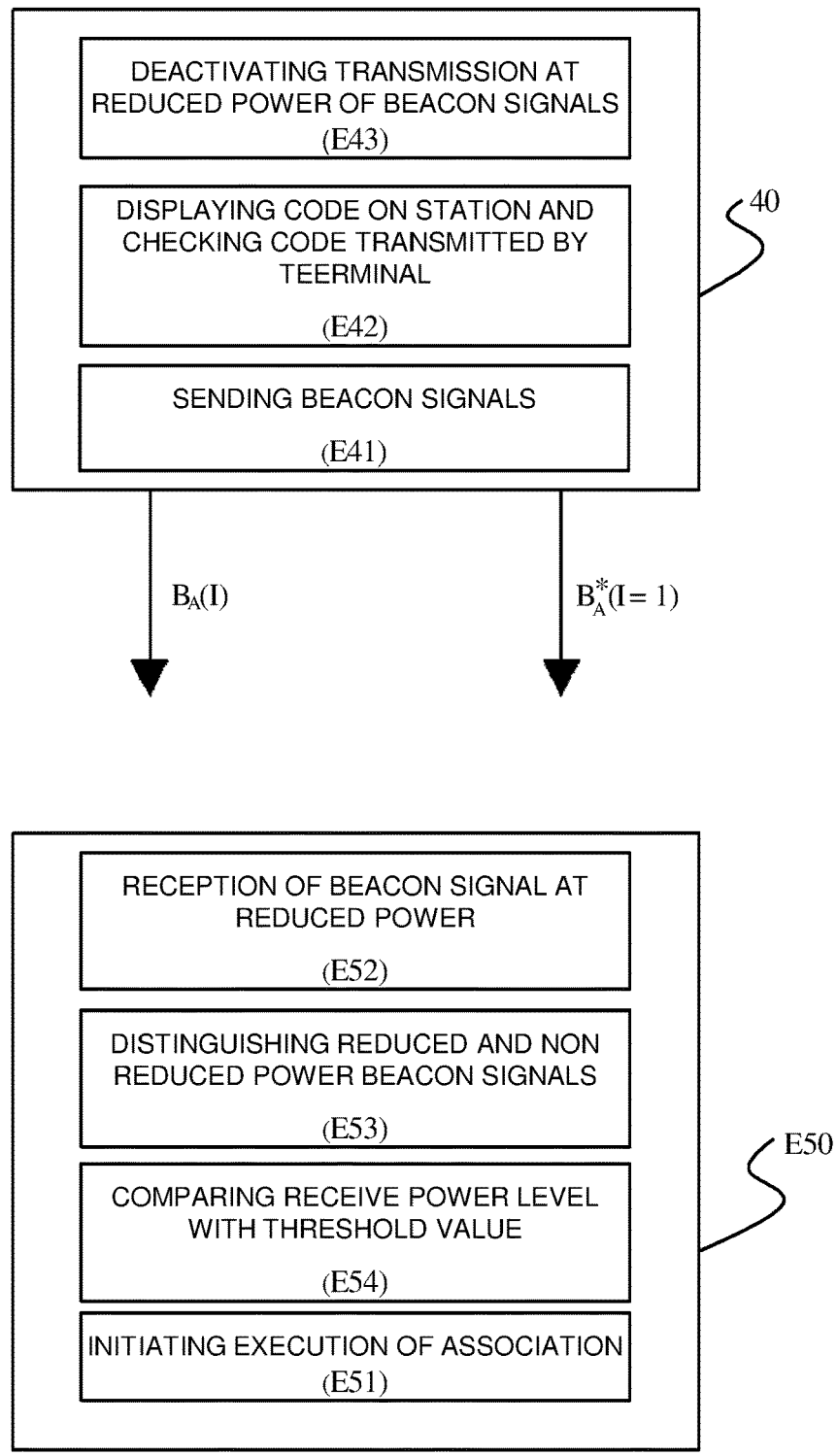
Figure 5A:
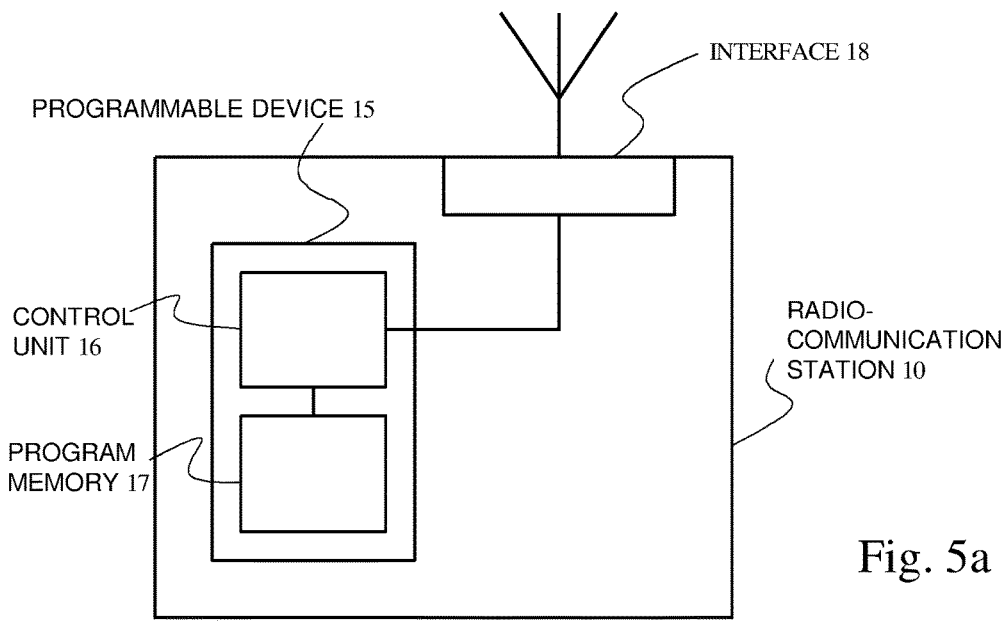
Figure 5B:
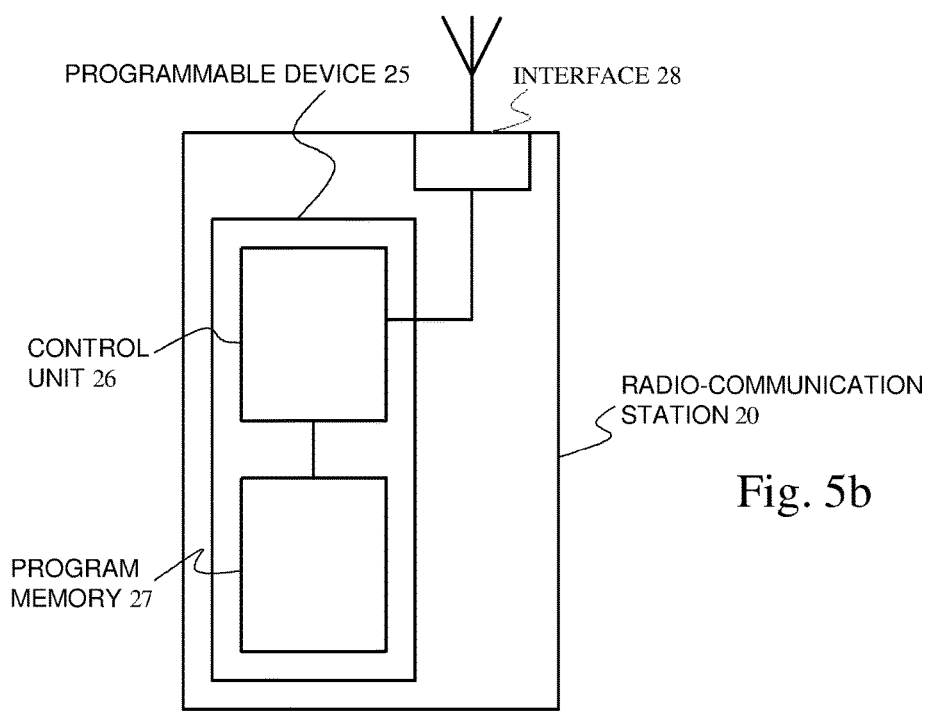

The features of the invention mentioned below, as well as others, will emerge more clearly from a reading of the following description of example embodiments, said description being given in relation to the accompanying drawings, among which:

FIG. 1 is a view of a radio-communication system provided with a radio-communication station and a radio-communication terminal according to the present invention, FIGS. 2a and 2b are diagrams illustrating the sending of beacon signals by a radio-communication station in a radio-communication system according to two embodiments of the present invention, FIG. 3 is a view of a radio-communication system provided with two radio-communication stations and a radio-communication terminal according the present invention, FIG. 4 is a diagram illustrating an association method according to the present invention, and FIGS. 5a and 5b are block diagrams respectively of a radio-communication station and of a radio-communication terminal according to the present invention.

The radio-communication system shown in FIG. 1 comprises a radio-communication station 10, such as a base station, and a radio-communication terminal 20, such as a mobile terminal. In order to be able to communicate with each other, these two radio-communication devices must be associated, meaning share a certain quantity of items of information, such as security keys and identifiers that they have previously exchanged and recorded during an association operation.

The base station 10 comprises means for sending beacon signals B that serve for transmitting information and for synchronising the radio-communication terminals, such as the terminal 20, that have previously been associated. Some of these beacon signals $B_A(I)$ carry association information I that indicates the availability or not of the base station 10 for executing an association operation.

As for the radio-communication terminal 20, this comprises means for, on reception of a beacon signal $B_A(I)$ comprising association information showing the availability of a radio-communication station 10 (by convention, I=1 will be written when the base station 10 is available and I=0 when it is not) sending said beacon signal $B_A(I)$, initiating, if it has not already been associated with the radio-communication station 10, execution of said operation of association with said radio-communication station 10.

As already mentioned in the introductory part of the present description, this association operation comprises, among other things, the exchange of messages containing information, such as security keys and identifiers, and the recording of this information and the like in the radio-communication station and in the terminal. These identifiers and security keys are necessary for establishing each of the radio-communications.

The radio-communication station 10 may display an identification code and transmit a message to the terminal 20 so that the user enters the code displayed on the terminal 20 (which implies that the terminal 20 is close to the station 10, otherwise the user cannot be aware of the displayed code), which transmits the entered code, the radio-communication station 10 verifying that these codes match and enabling execution of the association operations.

According to the present invention, the sending means of said radio-communication station 10 are configured to send, at reduced power compared with the transmit power of the other beacon signals B, at least some of said beacon signals carrying association information (they will then be denoted $B^*_A(I=1)$). In addition, the association information I of said beacon signals $B^*_A(I=1)$ sent at reduced power by a radio-communication station 10 is such that said association information I continuously indicates that said radio-communication station 10 is available for performing an association operation (I=1).

In the case of a DECT radio-communication system, the beacon signals B sent by the base station are carried by a system information channel Q of the BMC service. The beacon signals $B_A(I)$ that carry association information carry so-called Q3 messages (header H=3), which themselves contain the association information I in the form of a bit, referred to as the a44 bit (I=a44).

Thus, according to the present invention, at least some of the beacon signals carrying Q3 messages, or even all the beacon signals carrying Q3 messages, are sent at reduced power and have their association bit a44 at one (I=a44).

The transmit power that is reduced compared with the other beacon signals B enables limiting the dimensions of the coverage area of the concerned beacon signals (see circle 11 in FIG. 1) to dimensions considerably less than the dimensions (see circle 12 in FIG. 1) of the other beacon signals B, in particular those allowing synchronisation of the terminals with the base station, and of the beacon signals $B_A(I)$. Thus is defined the proximity at which a mobile terminal 20 wishing to be associated (in accordance with the present invention) must be in order to avoid having to initiate the association operation by manipulations on the radio-communication station 10 and on the terminal 20.

This reduced power may for example be obtained by deactivating the transmit amplifier, or by selecting only a subassembly of the antennas normally used for transmission, or by greatly attenuating the transmitted signal by means of specific components. For information, the transmission of a power less than 20 µW enables limiting the visibility of the beacon signal to a few tens of centimeters.

In a first embodiment, all the beacon signals carrying association information are sent at reduced power. In this case, a terminal 20 that has not been associated and which is situated in the coverage area of these beacons signals $B^*_A(I=1)$ (inside the circle 11) and which is therefore close to the radio-communication station 10, automatically initiates the execution of the association operation, without intervention by the user.

In another embodiment, only a certain quantity of beacon signals $B^*_A(I=1)$ carrying association information are sent at reduced power, the others $B_A(I)$ being sent at the same power as the other beacon signals B.

Then a mobile terminal situated in the coverage area of the beacon signals carrying association information sent at reduced power $B^*_A(I=1)$, meaning close to the base station 10 (inside the circle 11 in FIG. 1), receives from this radio-communication station 10 firstly these beacon signals $B^*_A(I=1)$ indicating that it is available for an association operation (I=1) and that it is able to receive an association request, and secondly the other beacon signals $B_A(I)$ carrying association information I that indicates that it is not available for an association operation and that it is therefore not able to receive an association request, unless has taken place a particular activation event, such as pressing on a particular key, a particular selection in a menu, etc. The association operation can then be executed automatically.

According to an advantageous embodiment of the present invention, a mobile terminal is configured to initiate the execution of an operation of association with a radio-communication station 10 if it has received from the latter firstly a first beacon signal at reduced power $B^*_{A1}$ with association information (I=1) indicating the availability of this radio-communication station 10 for this operation (in the case of the DCET standard, the bit a44=1), and secondly a second beacon signal $B_{A1}$ at non-reduced power with association information (I=0) indicating the non-availability of this same radio-communication station 10 for this operation (in the case of the DECT standard the bit a44=1).

As for a mobile terminal, such as the terminal 20 in FIG. 1, situated outside the coverage area of the beacon signals $B^*_A(I=1)$ carrying association information sent at reduced power but still in the coverage of the other beacon signals $B_A(I)$ carrying association information (and therefore in the area included in FIG. 1 outside the circle 11 and inside the circle 12), it receives only the latter $B_A(I)$ indicating to it that the base station 10 is not available and cannot receive an association request, unless a particular activation event has taken place. For this terminal, the association operation can be triggered only as in the prior art, meaning after the occurrence of such an event, such as an intervention by the user by selecting an option in a menu, pressing on a particular key, etc.

The present invention may be implemented by adding an additional key in the software management interface of the radio (API: Application Programming Interface). This additional key may for example have a parameter for activation or deactivation of the transmission at reduced power of the or some beacon signals carrying association information, enabling for example selecting an operating mode according to the present invention or on the contrary an operating mode according to the prior art. It may also have a parameter for selecting the radio power to be used for the transmission of these beacon signals, thus enabling defining the dimensions of the coverage area of these beacon signals.

In a DECT radio-communication system, a beacon signal (dummy bearer) is transmitted in each TDMA (Time Division Multiple Access) frame, with a different content at each frame. ETSI EN 300 175-1 specifies that the quantity of beacon signals transmitted by the DECT base station shall be at least one per TDMA frame, without however specifying any maximum quantity. The choice of time slots and frequency channels of these beacon signals is made by the base station according to its radio environment.

Each of these beacon signals occupies a different time and frequency location in the TDMA frame. In addition, a message of the Qx type is transmitted by a beacon signal on certain defined frames. A beacon signal containing a Q3 message (the one that contains the association bit, in this case the bit a44) is therefore transmitted cyclically among all the beacon signals.

Thus a radio-communication station cyclically sends a series of beacon signals B, among which at least one beacon signal $B^*_A(I=1)$ and/or $B_A(I)$ carries association information I.

In a case where the beacon signals $B^*_A(I=1)$ carrying association information are sent at reduced power and others $B_A(I)$ are sent at non-reduced power, two embodiments can be envisaged.

According to a first embodiment (see FIG. 2a), the radio-communication station 10 is configured to send the beacon signals $B^*_A(I=1)$ carrying association information at reduced power in the same frame (the frames n−3, n and n+3 in FIG. 2a) as the beacon signals $B_A(I)$ carrying association information at non-reduced power. Thus, applied to the DECT standard, in the same frame, there are a beacon signal carrying a Q3 message with the bit a44=1 sent at reduced power and a beacon signal, sent at non-reduced power, carrying a Q3 message the bit a44 of which is either equal to 0 or equal to 1 depending on whether or not a particular activation event has previously taken place.

According to a second embodiment (see FIG. 2b), the radio-communication station 10 is configured to send cyclically a series of beacon signals carrying association information $B^*_A(I=1)$ and $B_A(I)$ (in the example in FIG. 2b, the frames n−3, n3 and n+3 form a series), at least one of these beacon signals being a beacon signal $B^*_A(I=1)$ sent at reduced power (sent in the frame n+3). Each beacon signal is sent in a separate frame.

Thus, applied to the DECT standard, in each frame in a series of frames there is a beacon signal, sent at non-reduced power, carrying a Q3 message the bit a44 of which is either equal to 0, or equal to 1 if a particular activation event has previously taken place, with the exception of at least one frame in said series of frames in which there is a beacon signal sent at reduced power carrying a Q3 message with the bit a44=1.

It should be noted that a mobile terminal situated outside the coverage area of the beacon signal sent at reduced power does not receive this signal and therefore, for the frame containing this beacon signal, it does not receive any beacon signal at all. It will nevertheless not lose synchronisation with the base station since, according to the DECT standard, this loss of synchronisation is effective only after loss of a significant quantity of successive beacon signals.

According to another feature of the invention, the base station is provided with means for deactivating, following at least one particular event, the association function allowed by the beacon signal sent at reduced power. For example, this function may be deactivated by a manual action of the user.

It may be deactivated when the memory of the base station has reached a filling level beyond which it is considered that any new association is not desirable.

It may also be deactivated when the association mode using the beacon signal at non-reduced power has been initiated manually by the user.

It may also be deactivated outside a time range that is predefined, or defined by the user.

It may also be deactivated beyond a predefined activation period as from a particular event, such as the instant when the base station is powered up, the instant when a particular message is received from a remote operator, the instant of activation of a radio interface, or the instant of the association of a mobile terminal on another radio interface.

As mentioned above, by virtue of the present invention, it is possible to make the association operation completely automatic. To do this, the terminal 20 comprises means for activating, if it has not yet been associated with a radio-communication station 10, an association-seeking mode in which it continuously seeks beacon signals $B^*_A(I=1)$ that have been sent at reduced power by a radio-communication station and the association information I of which indicates the availability of this radio-communication station.

In the case where said mobile terminal is configured to initiate the execution of an operation of association with a radio-communication station if it has received from the latter a beacon signal $B^*_A(I=1)$ at reduced power with association information indicating the availability of said radio-communication station and a beacon signal $B_A(I=0)$ at non-reduced power with association information indicating the unavailability of the same radio-communication station, this association-seeking mode will also involve seeking for beacon signals $B_A(I=0)$ that have been sent at non-reduced power by the same radio-communication station and the association information of which indicates the unavailability of this radio-communication station.

This activation in an association-seeking mode is continuous but advantageously limited in time, in particular to avoid excessive energy consumption, especially in the receive part of the radio part of the terminal in question. For example, the continuous activation may be continuous until finalisation of the association of the terminal with a radio-communication station. It may be triggered for a given period during operations of initialisation of the terminal (setting of the time, choice of ringtones, etc) or when the batteries of the terminal are inserted. It may also be continuous in cyclic time periods until finalisation of the association of the terminal with the radio-communication station (for example 5 seconds of search every minute).

According to one feature of the present invention, a terminal 20 comprises means for comparing the receive power level of a beacon signal carrying association information (I) indicating that said radio-communication station (10) is available for performing an association operation (for example the data on the level of signal received from the base station, referred to as RSSI (Received Signal Strength Indication), given by the RSSI signal) with a threshold value and initiating execution of said association operation with said radio-communication station only if said receive power level is below said threshold value.

FIG. 3 shows two radio-communication stations 100 and 110 with the respective coverage areas 101 and 102, 111 and 112 of the beacon signals sent at reduced power $B^*_{A1}$ and $B^*_{A2}$ on one hand and beacon signals at non-reduced power $B_{A1}$ and $B_{A2}$ on the other hand.

If a terminal, such as the mobile terminal 200, is situated in the coverage area of the beacon signals $B^*_{A1}$ sent at reduced power from the first radio-communication station 100, it also receives these beacon signals $B^*_{A1}$ that indicate the availability of the sending radio-communication station 100 for executing an association operation, the beacon signals $B_{A1}$ sent at non-reduced power carrying the same information as the previous ones, but indicating the unavailability of the same radio-communication station 100 for executing an association operation. It also receives the beacon signals $B_{A2}$ sent by the radio-communication station 110 at non-reduced power and indicating the unavailability of this radio-communication station 110. The mobile terminal 200 can therefore initiate the execution of the operation of association with the radio-communication station 100.

If on the other hand, like the mobile terminal 210, it is placed at the same time in the respective coverage areas of the beacon signals $B_{A1}$ and $B_{A2}$ respectively sent at non-reduced power by the two base stations 100 and 110, but not in the coverage area of the beacon signals $B^*_{A1}$ and $B^*_{A2}$ sent at reduced power by one or other of the radio-communication stations 100 and 110, the mobile terminal 210 will not be able to initiate execution of the association operation.

According to one feature of the present invention, a mobile terminal comprises means for distinguishing, on the basis of the receive power, the beacon signals $B^*_{A1}$, $B^*_{A2}$ sent at reduced power and the beacon signals $B_{A1}$ and $B_{A2}$ sent at non-reduced power and for initiating execution of the association operations by selecting, optionally if there are a plurality of them, whichever of the radio-communication stations 100, 110 sent the beacon signals $B^*_A$ at reduced power. In the example in FIG. 3, the terminal 200 will initiate execution of the operations of association with the radio-communication station 100.

For example, to do this, these means use the RSSI data for the level of signal received from the radio-communication station.

To improve the guarantee of proximity of the radio-communication station 100 and of the mobile terminal 200 throughout the duration of the association operation, all the exchanges between them are made using a low transmission power, from each of them, around or equal to the transmission power of the second beacon signal. This allows being free from any attempt of fraudulent association coming from a mobile terminal situated outside the proximity area of this base station, and profiting from the fact that the latter is in an activated association mode.

The steps of a method for associating a radio-communication terminal with a radio-communication station according to the present invention are illustrated in FIG. 4. More exactly, the steps implemented by a radio-communication station are included in FIG. 4 in a rectangle 40 whereas those that are implemented by a radio-communication terminal are included in a rectangle 50.

The association method according to the invention therefore comprises:
  a step E41 of sending, by said radio-communication station, beacon signals, among which at least some of them $B^*_A(I=1)$ carry association information (I=1) indicating continuously that said radio-communication station is available for performing an association operation, said beacon signals $B^*_A(I=1)$ being sent at reduced power compared with the transmit power of the other beacon signals, and
  on reception by said radio-communication terminal of a beacon signal $B^*_A(I=1)$ carrying association information sent at reduced power, a step E51 of initiating the execution of the association operation per se.

According to one feature of the method, the step E51 of initiating the execution of the association operation is performed on reception E52 firstly of a beacon signal $B^*_A(I=1)$ sent at reduced power that comprises association information indicating the availability of said radio-communication station vis-à-vis the association operation and secondly a beacon signal $B_A(I)$ sent at non-reduced power by the same radio-communication station, which comprises association information indicating the non-availability of said radio-communication station vis-à-vis the association operation.

According to one feature of the method, said association method comprises a step E53 of distinguishing, on the basis of the receive power, the beacon signals $B^*_A(I=1)$ sent at reduced power and beacon signals $B_A(I)$ sent at non-reduced power, the step E51 of initiating the execution of the association operations selecting if necessary the radio-communication station that sent the beacon signals $B^*_A(I=1)$ at reduced power.

According to one feature of the method, said association method comprises a step E54 of comparing the receive power level with a threshold value and enabling the initiation of the execution of said operation of association with said radio-communication station only if said receive power level is below said threshold value.

According to one feature of the method, the message exchange steps of the association operations are performed at reduced power.

According to another feature of the method, it comprises a step E42 of displaying a code on the radio-communication station and checking that a code transmitted by a radio-communication terminal during the execution of the association operation is identical to the displayed code.

According to another feature of the method, it comprises a step E43 of deactivating the transmission at reduced power of the beacon signals carrying association information indicating continuously that a radio-communication station is available for performing an association operation.

FIG. 5a shows a radio-communication station 10 that consists firstly of a programmable device 15, itself consisting of a control unit 16 and a program memory 17, and secondly a radio communication interface 18. In the program memory 17 a program is loaded, for example previously recorded on a suitable medium, which comprises instructions or code parts and which, when it is executed by said programmable device 15, implements, utilising the interface 18, the means previously described in relation to a radio-communication station in a radio-communication system, for example according to FIG. 1. According to a variant embodiment, the means previously described in relation to a radio-communication station in a radio-communication system are implemented in hardware form by a dedicated component, such as an FPGA (Field-Programmable Gate Array) or an ASIC (Application-Specific Integrated Circuit).

FIG. 5b shows a radio-communication station 20 that consists firstly of a programmable device 25, itself consisting of a control unit 26 and a program memory 27, and secondly a radio communication interface 18. In the program memory 27 a program is loaded, for example previously recorded on a suitable medium, which comprises instructions or code parts and which, when it is executed by said programmable device 15, implements, utilising the interface 28, the means previously described in relation to a radio-communication station 20 in a radio-communication system, for example according to FIG. 1. According to a variant embodiment, the means previously described in relation to a radio-communication station in a radio-communication system are implemented in hardware form by a dedicated component, such as an FPGA (Field-Programmable Gate Array) or an ASIC (Application-Specific Integrated Circuit).

The invention claimed is:

1. A radio-communication system comprising at least one radio-communication station and at least one radio-communication terminal, each radio-communication station being configured for sending beacon signals, some of said sent beacon signals carrying association information indicating availability or not of said radio-communication station for executing an association operation, the radio-communication terminal being configured for, on reception of a beacon signal comprising association information showing availability for performing the association operation of the radio-communication station that sent said beacon signal, initiating the execution of said association operation with respect to said radio-communication station, wherein each said radio-communication station is configured for sending, at reduced power compared with a transmit power of the other beacon signals, at least some of said beacon signals carrying association information indicating continuously that said radio-communication station is available for performing the association operation.

2. The radio-communication system according to claim 1, wherein each radio-communication terminal is configured for initiating the execution of said association operation with respect to one radio-communication station on reception firstly of a beacon signal sent at reduced power that comprises association information indicating availability of said radio-communication station for performing the association operation and secondly a beacon signal sent at non-reduced power by the same radio-communication station which comprises association information indicating non-availability of said radio-communication station for performing the association operation.

3. The radio-communication system according to claim 1, wherein each radio-communication terminal is configured for distinguishing, on the basis of receive power information, the beacon signals sent at reduced power and the beacon signals sent at non-reduced power, and for initiating the execution of the association operation by selecting if necessary the radio-communication station that sent the beacon signals at reduced power.

4. The radio-communication system according to claim 1, wherein each radio-communication terminal is configured for comparing, with a threshold value, receive power level information concerning a beacon signal carrying association information indicating that said radio-communication station is available for performing the association operation, and for initiating the execution of said association operation with respect to said radio-communication station only if said receive power level is lower than said threshold value.

5. The radio-communication system according to claim 1, wherein each radio-communication station and/or radio-communication terminal is configured so that message exchanges during the association operation are performed at reduced power.

6. The radio-communication system according to claim 1, wherein each radio-communication station is configured for displaying a code and for checking that a code transmitted by a radio-communication terminal when the association operation is executed is identical to the displayed code.

7. The radio-communication system according to claim 1, wherein communications between each radio-communication station and each radio-communication terminal take place by transmission of frames, and wherein each radio-communication station is configured for sending at reduced power a beacon signal carrying association information indicating availability of said radio-communication station for performing the association operation, in the same frame as another beacon signal sent at non-reduced power, which carries association information indicating non-availability of said radio-communication station for performing the association operation.

8. The radio-communication system according to claim 1, wherein communications between each radio-communication station and each radio-communication terminal take place by transmission of frames, and wherein each radio-communication station is configured for cyclically sending a series of beacon signals carrying association information indicating availability or not of said radio-communication station, at least one beacon signal in said series being a beacon signal sent at reduced power and carrying association information continuously indicating availability of said radio-communication station for performing the association operation.

9. The radio-communication system according to claim 1, wherein each radio-communication station is configured for deactivating the transmission at reduced power of the beacon signals carrying association information indicating continuously that said radio-communication station is available for performing the association operation.

10. The radio-communication system according to claim 1, wherein each radio-communication terminal is, before performing the association operation per se, in an association-seeking mode in which said radio-communication terminal continuously seeks beacon signals, the association information of which indicates the availability of a radio-communication station for performing the association operation, said beacon signals being sent at reduced power.

11. A radio-communication station in a radio-communication system comprising at least said radio-communication station and at least one radio-communication terminal, said radio-communication station being configured for sending beacon signals, some of said sent beacon signals carrying association information indicating availability or not of said radio-communication station for executing an association operation, wherein said radio-communication station is configured for sending, at reduced power compared with a transmit power of the other beacon signals, at least some of said beacon signals carrying association information indicating continuously that said radio-communication station is available for performing the association operation.

12. A radio-communication terminal in a radio-communication system comprising at least one radio-communication station and at least said radio-communication terminal, said radio-communication terminal being configured for initiating, on reception of a beacon signal comprising association information showing availability of one radio-communication station that has sent said beacon signal, the execution of said association operation with respect to said radio-communication station, wherein said radio-communication terminal is configured for initiating execution of said association operation with respect to one radio-communication station on reception therefrom firstly of a beacon signal, sent at reduced power compared with the transmit power of the other beacon signals that said radio-communication terminal receives, which comprises association information indicating availability of said radio-communication station, and secondly a beacon signal sent at non-reduced power by the same radio-communication station, which comprises association information indicating non-availability of said radio-communication station for performing the association operation.

13. An association method for performing an association operation for associating a radio-communication terminal with a radio-communication station in a radio-communication system, wherein the association method comprises:
  sending, by said radio-communication station, beacon signals at least some of which carry association information continuously indicating that said radio-communication station is available for performing the association operation, said beacon signals being sent at reduced power compared with a transmit power of other beacon signals, and
  on reception by said radio-communication terminal of a beacon signal carrying association information sent at reduced power, initiating execution of the association operation per se.

14. The association method according to claim 13, wherein initiating execution of the association operation is performed on reception firstly of a beacon signal sent at reduced power which comprises association information indicating availability of said radio-communication station for performing the association operation, and secondly of a beacon signal sent at non-reduced power by the same radio-communication station, which comprises association information indicating non-availability of said radio-communication station for performing the association operation.

* * * * *